(12) United States Patent
Wakumoto

(10) Patent No.: US 9,344,356 B2
(45) Date of Patent: May 17, 2016

(54) TRANSMITTING A PACKET FROM A DISTRIBUTED TRUNK SWITCH

(75) Inventor: Shaun Wakumoto, Roseville, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 1474 days.

(21) Appl. No.: 11/680,089

(22) Filed: Feb. 28, 2007

(65) Prior Publication Data

US 2008/0205387 A1 Aug. 28, 2008

(51) Int. Cl.
*H04L 12/709* (2013.01)
*H04L 12/721* (2013.01)
*H04L 12/935* (2013.01)
*H04L 12/939* (2013.01)

(52) U.S. Cl.
CPC .............. *H04L 45/245* (2013.01); *H04L 45/66* (2013.01); *H04L 49/3009* (2013.01); *H04L 49/552* (2013.01); *Y02B 60/33* (2013.01)

(58) Field of Classification Search
None
See application file for complete search history.

(56) References Cited

U.S. PATENT DOCUMENTS

| | | | | |
|---|---|---|---|---|
| 5,923,654 A * | 7/1999 | Schnell | ................ | H04L 45/745 370/390 |
| 6,016,310 A * | 1/2000 | Muller | ................ | H04L 12/4633 370/255 |
| 6,049,528 A * | 4/2000 | Hendel | ................... | H04L 29/06 370/235 |
| 6,151,297 A | 11/2000 | Congdon et al. | | |
| 6,496,502 B1 * | 12/2002 | Fite, Jr. | ............... | H04L 12/4641 370/338 |
| 6,804,233 B1 * | 10/2004 | Congdon | ................ | H04L 29/06 370/340 |
| 6,807,179 B1 * | 10/2004 | Kanuri | .................. | H04L 49/351 370/230 |
| 6,928,059 B1 * | 8/2005 | Valentine | ................ | H04L 41/12 370/255 |
| 7,173,934 B2 * | 2/2007 | Lapuh | ................... | H04L 45/245 370/220 |
| 7,251,217 B2 * | 7/2007 | Wong | ................... | H04L 47/125 370/232 |
| 7,383,353 B2 | 6/2008 | Valdevit et al. | | |
| 7,447,198 B1 | 11/2008 | Banks et al. | | |
| 7,463,579 B2 * | 12/2008 | Lapuh | ..................... | H04L 45/00 370/216 |
| 7,633,883 B2 | 12/2009 | Cho et al. | | |
| 7,719,958 B1 * | 5/2010 | Azimi | ..................... | H04L 12/18 370/220 |
| 7,796,506 B2 * | 9/2010 | de Heer | .............. | H04L 12/4625 370/229 |
| 2002/0051458 A1 * | 5/2002 | Carvey | .................... | H04L 45/04 370/401 |
| 2002/0071436 A1 * | 6/2002 | Border | ............... | H04B 7/18582 370/395.32 |
| 2002/0141412 A1 | 10/2002 | Wong et al. | | |
| 2003/0097470 A1 * | 5/2003 | Lapuh | ................... | H04L 45/245 709/239 |
| 2004/0024906 A1 | 2/2004 | Valdevit et al. | | |
| 2004/0037278 A1 * | 2/2004 | Wong | ..................... | H04L 47/125 370/389 |
| 2004/0133693 A1 | 7/2004 | Wils et al. | | |
| 2004/0252639 A1 * | 12/2004 | Hunter | .................... | H04L 45/00 370/229 |
| 2005/0080923 A1 * | 4/2005 | Elzur | ...................... | H04L 47/10 709/238 |
| 2007/0071011 A1 * | 3/2007 | de Heer | .............. | H04L 12/4625 370/395.53 |
| 2007/0098006 A1 * | 5/2007 | Parry | ................... | H04L 12/4633 370/437 |
| 2007/0171908 A1 | 7/2007 | Tilman et al. | | |
| 2007/0230357 A1 * | 10/2007 | Lin | ..................... | H04L 12/2697 370/241.1 |

* cited by examiner

*Primary Examiner* — Ayaz Sheikh
*Assistant Examiner* — Faiyazkhan Ghafoerkhan
(74) *Attorney, Agent, or Firm* — Thorpe, North & Western L.L.P.

(57) ABSTRACT

A method of transmitting a packet from a distributed trunk (DT) switch and a computer-readable medium storing instructions therefor is described. The method comprises receiving a packet from a device connected to the DT switch, transmitting the received packet via a non-distributed trunk port of the DT switch, and forwarding the received packet via a DT port of the DT switch for each received packet based on a determination of whether to forward the received packet based on an address of the received packet. The method also comprises forwarding the received packet via a distributed trunk interconnect port for each received packet received via one of a non-DT port and a DT port.

18 Claims, 10 Drawing Sheets

TRANSMITTING A PACKET FROM A DISTRIBUTED TRUNK SWITCH

RELATED APPLICATION

The present application is related to co-pending application entitled, "Transmitting A Packet From A Distributed Trunk Switch," having issued as U.S. Pat. No. 8,213,430 on Jul. 3, 2012, by the instant inventor, assigned to the same assignee, filed on the same date herewith, and is hereby incorporated by reference herein in its entirety.

BACKGROUND

Trunking enables the connection of two networked devices together using multiple links between the devices. Using multiple links provides for greater redundancy, e.g., if one of the links fails, the other link may be used. Additionally, multiple links may provide greater bandwidth between the devices and may provide load balancing over the connecting links.

FIG. 1 depicts a high-level block diagram of trunking in use connecting two devices, i.e., a first device 100 such as a switch or a server or other networked device, and a trunk switch 102 able to communicate over either link connecting the two devices. A pair of communication links 104, 106 communicatively connect device 100 and trunk switch 102 to each other. Communication links 104, 106 connect to trunk ports 108, 110, respectively, at trunk switch 102. The pair of communication links 104, 106 are collectively referred to as a trunk 112 (dashed line) connecting device 100 and trunk switch 102.

Assuming device 100 is a switch, FIG. 1 depicts two switches connected via a two-port trunk 112. Specifically, ports 114, 116 connect respectively to trunk ports 108, 110 of trunk switch 102 via links 104, 106. If a unicast packet, i.e., a packet sent from one device to one other device, was transmitted from trunk switch 102 to device 100, then trunk switch 102 selects a single link of 104, 106 over which to forward the packet to the device. If trunk switch 102 were to instead transmit the packet on both ports, then device 100 receives two copies of the same packet and forwards both copies thereby increasing, by duplication, the traffic on the network.

The selection of which port to use for forwarding packets is based on the traffic content. Trunk switch 102 performs a hash on several attributes within the particular packet to be forwarded. For example, trunk switch 102 may perform a logical XOR of the source and destination media access control (MAC) addresses and performs a modulus of the hash result based on the number of ports in the trunk, e.g., trunk 112.

A type of switch which forwards packets based on a MAC layer address is a layer 2 switch. A feature of a layer 2 switch is that the switch keeps track of the source MAC addresses of received packets and the particular port on which the packet is received. For example, if device 100 transmits traffic, e.g., a communication packet, to trunk switch 102 using link 104 (and port 108), the trunk switch tracks that the device is reachable via trunk (logical port) 112. Later transmissions received by trunk switch 102 which are destined for device 100 will be transmitted to the device by the trunk switch using logical port 112, i.e., one of ports 108, 110.

DESCRIPTION OF THE DRAWINGS

One or more embodiments of the present invention are illustrated by way of example, and not by limitation, in the figures of the accompanying drawings, wherein elements having the same reference numeral designations represent like elements throughout and wherein.

DETAILED DESCRIPTION

Figure 1:
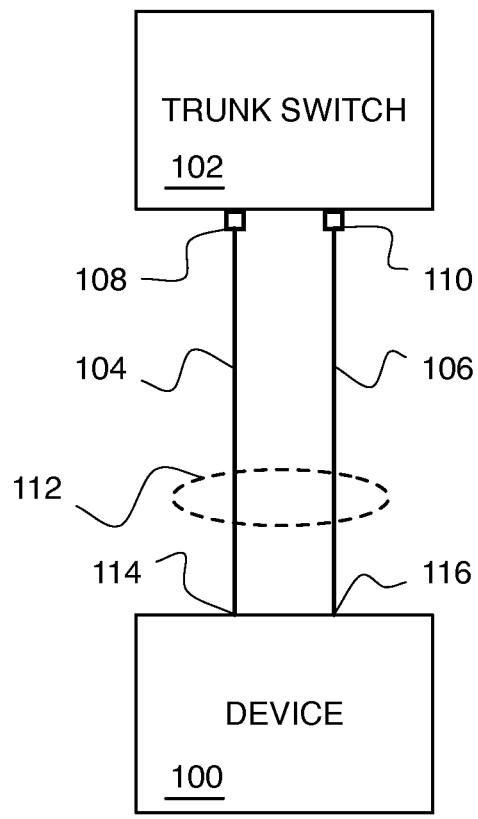
FIG. 1 is a high-level block diagram of trunking.
Figure 2:
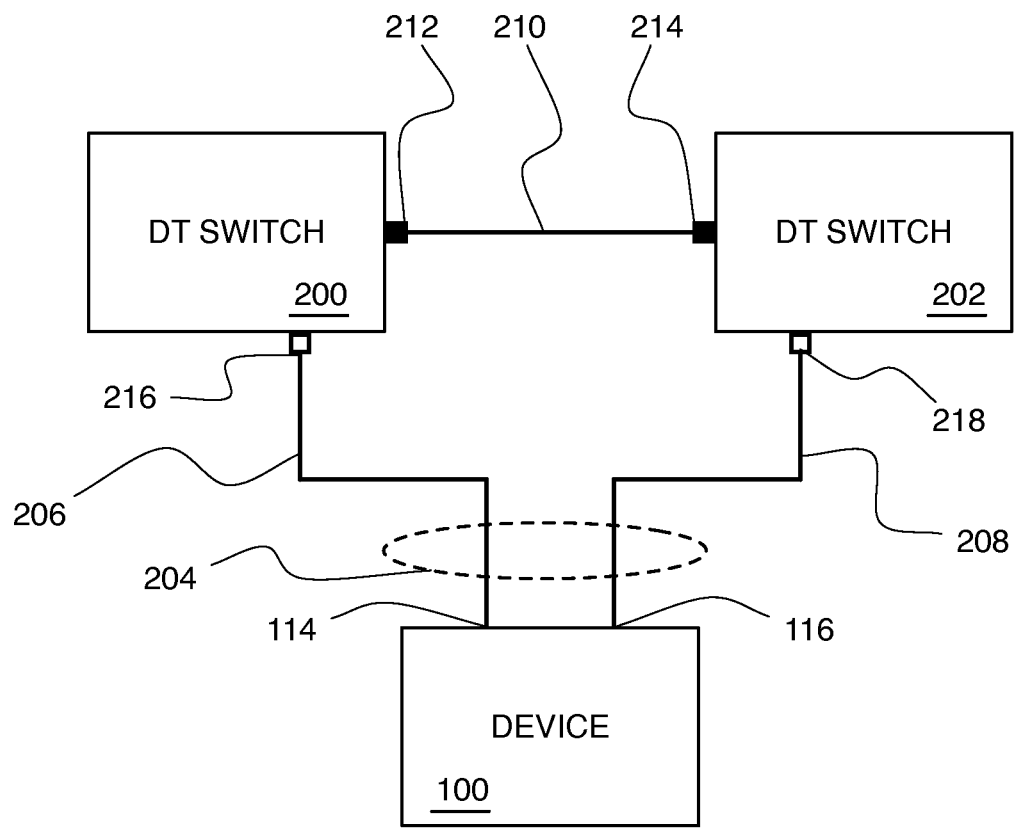
FIG. 2 is a high-level block diagram of distributed trunking according to an embodiment.

FIG. 2 depicts a particular embodiment of trunking referred to as distributed trunking (DT). Similar to the trunking described in connection with FIG. 1, DT refers to the use of port trunking to connect a single device to two DT-capable devices, e.g., switches. In this manner, a single device, e.g., device 100, connects via a DT to a first distributed trunk switch 200 and a second distributed trunk switch 202 using a distributed trunk 204 comprising links 206, 208. Distributed trunk 204 is referred to as a distributed trunk based on the distribution of links 206, 208 comprising the distributed trunk being distributed between two DT switches 200, 202. DT switches 200, 202 may be communicatively coupled with additional networked devices, e.g., switches, servers, etc. Device 100 may comprise a server and/or a switch or other networked device.

In some embodiments, device 100 is a switch connected with additional networked devices. In some embodiments, greater than two communication links may connect device 100 and DT switches 200, 202. In some further embodiments, greater than two DT switches 200, 202 may be connected with device 100 in a distributed trunking manner. In this manner, greater redundancy and/or greater bandwidth may be provided between device 100 and DT switches 200, 202. Further, if a single DT switch fails, the remaining DT switch is able to provide communication functionality for device 100.

FIG. 2 depicts DT switches 200, 202 communicatively connected with each other via communication link 210 (also referred to as a distributed trunk interconnect (DTI) link). Communication link 210 connects distributed trunk interconnect (DTI) port 212 of DT switch 200 with DTI port 214 of DT switch 202. Similarly, link 206 connects port 114 of device 100 to a DT port 216 of DT switch 200 and link 208 connects port 116 of the device to a DT port 218 of DT switch 202. DT switch 200 has designated DT port 216 as a distributed trunk port to indicate that communication received/sent via the port is communicated over distributed trunk 204 connected with device 100.

Using DT, device 100, e.g., a server, comprises two sets of links spanning two different switches 200, 202. DT enables device-level redundancy without requiring additional functionality on the device, e.g., device 100. In some embodiments, device 100 requires no additional drivers and/or functionality in order for the DT mechanism to operate. In particular, device 100 views the DT switches 200, 202 to which the device is connected as a single virtual switch in operation providing similar functionality to the device as in FIG. 1. DT additionally supports link aggregation control protocol (LACP) as the trunking protocol between device 100 and DT switches 200, 202. That is, DT switches 200, 202 appears as a single trunking device to device 100.

As depicted in FIG. 2, the term upstream forwarding refers to the transmission of communication packets from device 100 toward DT switches 200, 202 and the term downstream forwarding refers to the transmission of communication packets from the DT switches and above (top of page), e.g., additional devices connected with the DT switches, to the device.

In operation, DT switch 200 communicates with DT switch 202 via DTI link 210 using a predetermined DT communication protocol (DTCP). DTCP comprises communication of packets comprising information such as DT configuration information related to the configuration of DT 204, LACP attributes such as aggregator MAC address, priority, keys, transmission interval, etc., traffic hashing/algorithms used by DT switches 200, 202, master/slave negotiation information, and DT port speed, media type, etc.

Additionally, DT switches 200, 202 communicate over DTI link 210 to maintain knowledge of addresses, e.g., MAC addresses, of device 100 connected to DT ports, e.g., 216, 218. DT switch 200 informs DT switch 202 of addresses learned via DT port 216, and vice versa, with respect to DT switch 202 and DT port 218. Further, based on knowledge that both DT switches 200, 202 are distributed trunk connected to device 100 via DT ports 216, 218, if DT switch 200 learns of an address via DT port 216, the information may be relayed to DT switch 202 to enable DT switch 202 to add the learned address as corresponding to DT port 218 based on the fact that distributed trunk 204 is connected to device 100.

For example, assuming Table 1 comprises a table of addresses and ports corresponding to the addresses known to DT switch 200, if DT switch 200 receives a packet from device 100 via DT port 216, Table 1 appears as follows:

TABLE 1

| Address | Port |
| --- | --- |
| Device 100 | DT Port 216 |

After DT switch 200 "learns" of device 100 on DT port 216, the DT switch communicates the information to DT switch 202. In one embodiment, DT switch 200 transmits a signal to DT switch 202 indicating receipt of a packet from the address for device 100 over a DT port which is part of DT link 204 shared with DT switch 202. DT switch 202, by virtue of the knowledge that the information was received over DT link 204 stores the address of device 100 in a table, e.g., Table 2, comprising addresses and ports corresponding to the addresses known to DT switch 202, as follows:

TABLE 2

| Address | Port |
| --- | --- |
| Device 100 | DT Port 218 |

According to this embodiment, DT switches 200, 202 add additional addresses and ports to Tables 1 and 2 as further packets are received, e.g., from below device 100 and/or from above the DT switches.

In further operation, assuming DT switch 202 is configured as a slave switch with respect to DT switch 200, if DTI port 214 fails (DTI link 210 failure), then DT switch 200 disables the corresponding DT port 218. In some embodiments, disabling of DT port 218 may be performed via either bringing down the link 208 and/or via the LACP (if LACP is the trunking protocol in use).

In some embodiments, trunking may be used to comprise DTI link 210 between DT switches 200, 202, e.g., multiple communication links may make up the communicative coupling between the DT switches. According to this embodiment, each DT switch 200, 202 comprises one or more DTI ports connected to one or more corresponding communication links connecting the DT switches.

In at least one embodiment, each DT switch is paired with another DT switch, e.g., DT switches 200, 202. According to this embodiment, the paired DT switches may be DTI connected with each other without being paired to a third DT switch. One or more additional devices, e.g., device 100, may be connected to DT switches 200, 202 in a DT manner and/or via a network communication connection with one or the other of the DT switches.

In at least some embodiments, the DTI ports, e.g., DTI ports 212, 214 of the DT switches 200, 202, are members of the virtual local area networks (VLANs) configured for the DT switches. Broadcast, multicast, and destination look-up failure (DLF) packets received by one of the two DT switches are forwarded to the other of the two DT switches. If the particular packet is received on a non-DT port, i.e., traveling downstream toward device 100, then the packet is forwarded out one of the DT ports, i.e., DT port 21, 218, to device 100 over DT 204.

The present described embodiments provide feature interaction with a spanning tree protocol (STP) in order to provide additional redundancy. In order to operate with STP, DTI ports connecting DTI link 210 between DT switches 200, 202 are not blocked due to STP. In at least one embodiment, in order to avoid STP blocking of DTI ports, the port cost of DTI ports is set to the lowest value possible with respect to the STP. Further, as described above, downstream connections to DT switches 200, 202 looking toward device 100 view the DT switches as separate devices whereas the upstream connection from device 100 views the DT switches as a single trunked device similar to the configuration of FIG. 1. Further still, device 100 connected to DT switches 200, 202 is not allowed to execute STP. In at least one embodiment, a bridge protocol data unit (BPDU) blocker/filter is applied on DT ports 216, 218 via DT switches 200, 202 in order to prevent STP from executing with respect to the DT ports.

Figure 3:
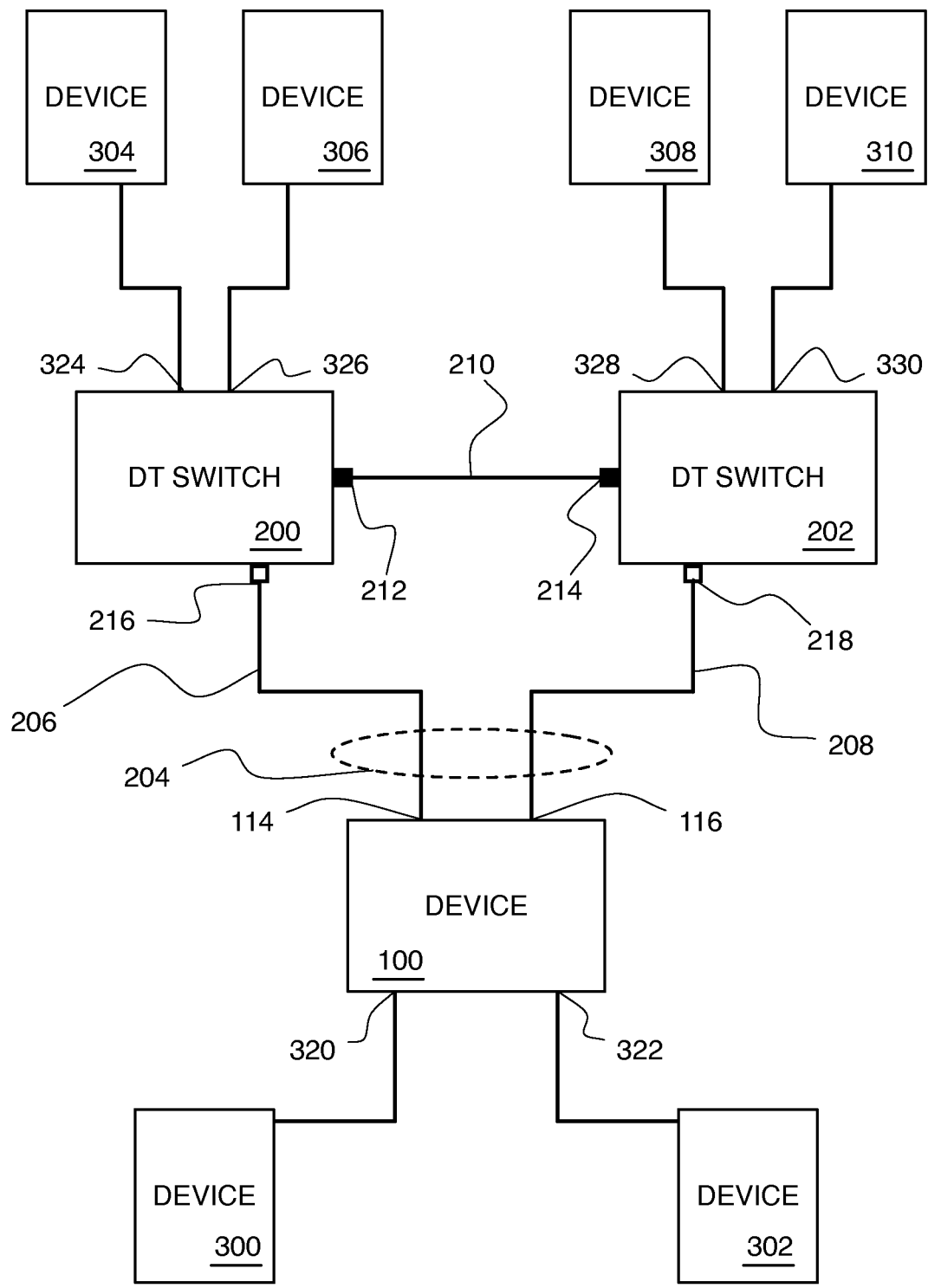
FIG. 3 is a high-level block diagram of distributed trunking according to another embodiment.

FIG. 3 depicts a high-level block diagram of DT switches 200, 202 connected in a distributed trunking manner as described in connection with FIG. 2 above and further comprising a pair of downstream devices 300, 302 communicatively coupled with device 100, e.g., a switch, and two pair of upstream devices 304, 306 and 308, 310 communicatively coupled with DT switches 200, 202, respectively. That is, device 100 operates as a switch with respect to devices 300, 302 and DT switches 200, 202 operate as switches with respect to devices 304, 306 and 308, 310, respectively.

Further specifically, devices 300, 302 connect with device 100 via ports 320, 322, respectively. Ports 320 and 322 are neither DT ports nor DTI ports (also referred to as non-DT ports). Devices 304 and 306 connect with DT switch 200 via ports 324, 326, respectively. Ports 324 and 326 are neither DT ports nor DTI ports of DT switch 200 (also referred to as non-DT ports). Similarly, devices 308 and 310 connect with DT switch 202 via ports 328 and 330, respectively. Ports 328 and 330 are neither DT ports nor DTI ports of DT switch 202.

In order to manage the transmission of received packets via the DT switches 200, 202, the DT switches (as referred to above) maintain a table of addresses corresponding to, for example, the source MAC address of a packet along with the port at the particular DT switch at which the packet is received. For example, DT switch 200 may receive packets from device 304 via port 324, from device 306 via port 326, from DT switch 202 via DTI port 212, and from device 100 via DT port 216. Additionally, DT switch 200 may receive packets from device 300 via DT port 216 and/or DTI port 212, depending on the algorithm used by device 100 in deciding the link of DT 204 to use to send the packet from device 300. Further, DT switch 200 may receive packets from devices 308, 310 via DTI port 212. Similar packet communication may be received by DT switch 202 from devices 300-310, device 100, and DT switch 200.

Figure 4:
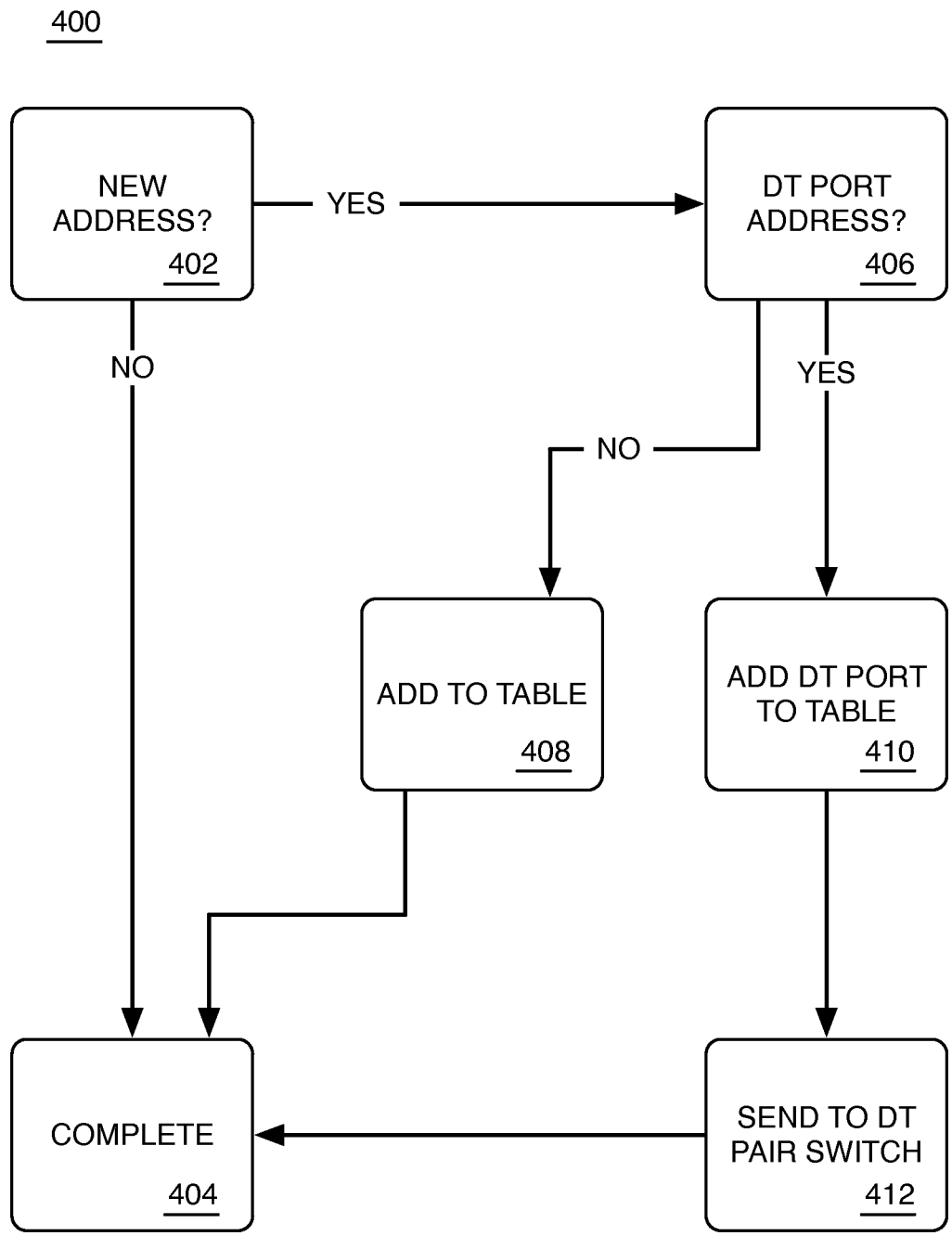
FIG. 4 is a high-level process flow diagram of a portion of a method according to an embodiment.

FIG. 4 depicts a high-level process flow diagram of a portion 400 of a method of maintaining the table for DT switch 200 based on receipt of a packet from a device. Execution of flow portion 400 by DT switch 200 causes the DT switch to evaluate received packet communication. After receipt of a packet, DT switch 200 executes new address functionality 402 and determines whether the received packet comprises a new source address, e.g., the DT switch performs a lookup of the address table for the source MAC address of the received packet.

If the result of new address functionality 402 is negative (NO), the flow proceeds to complete functionality 404 and DT switch 200 proceeds to transmit the received packet to the destination address, e.g., the destination MAC address specified in the packet based on the address table information. If the result of new address functionality 402 is positive (YES), the flow proceeds to DT port address functionality 406 and DT switch 200 determines whether the port on which the DT switch received the packet is a DT port, e.g., DT port 216.

If the result of DT port address functionality 406 is negative (NO), the flow proceeds to add to table functionality 408 and DT switch 200 adds the source address and port on which the received packet was received to address table. The flow then proceeds to complete functionality 404.

If the result of DT port address functionality 406 is positive (YES), the flow proceeds to add DT port to table functionality 410 and DT switch 200 adds the source address and DT port on which the received packet was received to address table. The flow then proceeds to send to DT pair switch 412 functionality 412 wherein DT switch 200 transmits the source address and an indicator that the source address was received via a DT port to DT switch 202 using the predetermined protocol over DTI link 210. The flow then proceeds to complete functionality 404.

Figure 5:
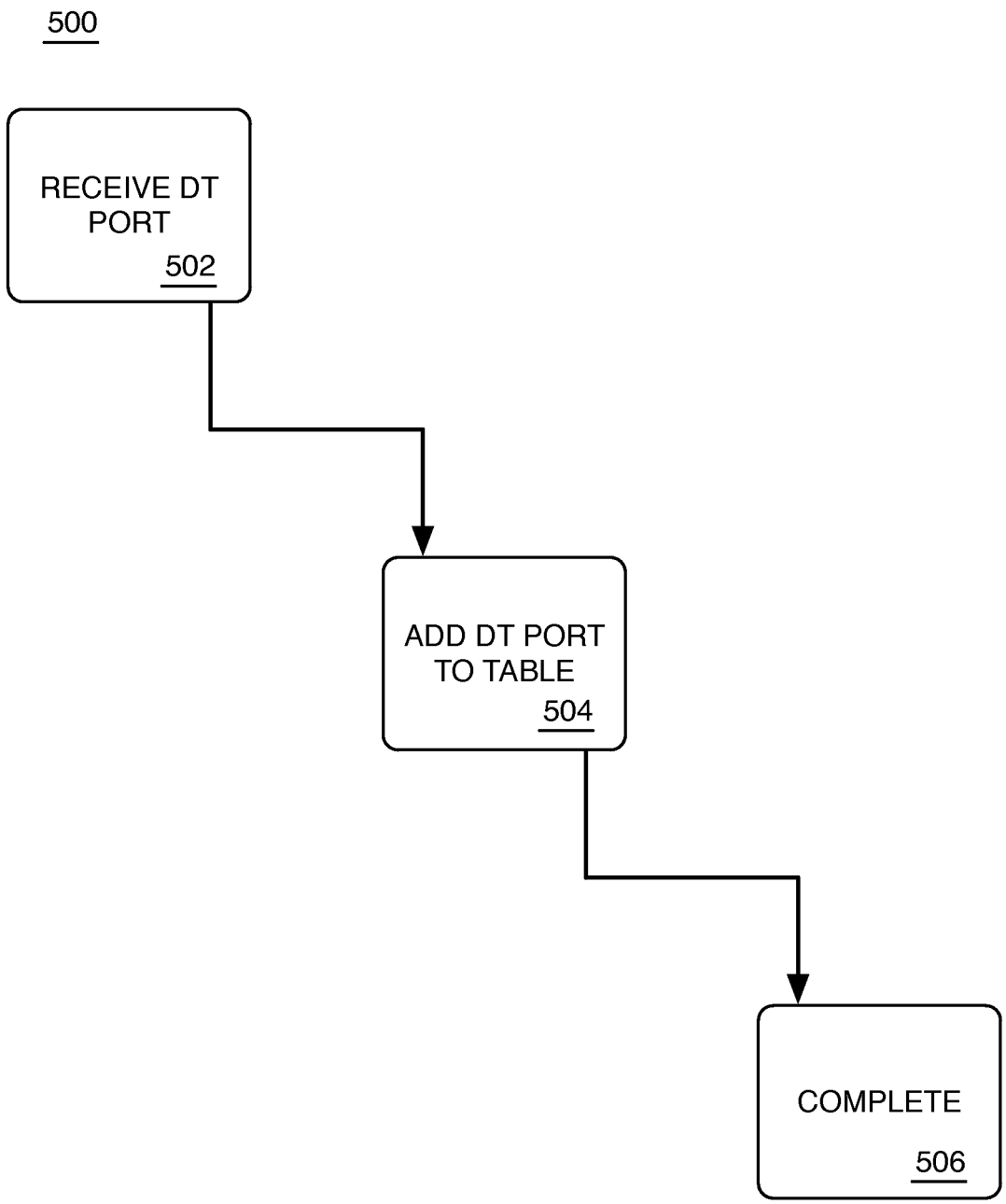
FIG. 5 is a high-level process flow diagram of another portion of a method according to an embodiment.

FIG. 5 depicts a high-level process flow diagram of a portion 500 of a method of maintaining the table for DT switch 202 based on receipt of DT port information from DT switch 200, e.g., via the predetermined protocol over DTI link 210. After receipt of DT port information from DT switch 200, DT switch 202 executes receive DT port functionality 502. The flow then proceeds to add DT port to table functionality 504 wherein DT switch 202 adds the source address, e.g., the source MAC address, and the DT port corresponding to link 208 of DT 204 to the address table of DT switch 202 along with an indication that the address is connected to a DT port, i.e., DT port 218. The flow then proceeds to complete functionality 506.

By DT switches 200, 202 executing the method portions 400, 500, the DT switches effectively ignore new source addresses received on DT ports and appearing on the DTI port 212, 214. Depending on the algorithm executed by device 100, the device may transmit a first packet having a destination of device 306 to DT switch 200 (via link 206) and the device may transmit a second packet having a destination of device 304 to DT switch 202 (via link 208). Without the above method portions 400, 500, DT switch 200 would switch the port in the address table assigned to device 100 from DT port 216 to DTI port 212. Assuming device 100 is a switch as depicted in FIG. 3, DT switch 200 may end up switching multiple address table entries for each device downstream of device 100. In at least one instance, repeated address switching may cause thrashing to occur on the DT switch.

In accordance with the method portions 400, 500, the DT switches 200, 202 do not switch address table entries for new source addresses received over DTI ports. The DT switches 200, 202 add an entry to the address table corresponding to receipt of DT port information from the other DT switch over the DTI link 210.

After transmission of packets of communication between the devices depicted in FIG. 3, the address table of DT switch 200 appears as follows:

TABLE 3

| Address | Port |
| --- | --- |
| Device 100 | DT port 216 |
| Device 300 | DT port 216 |
| Device 302 | DT port 216 |
| DT switch 202 | DTI port 212 |
| Device 304 | port 324 |
| Device 306 | port 326 |
| Device 308 | DTI port 212 |
| Device 310 | DTI port 212 |

The address table of DT switch 202 appears as follows:

TABLE 4

| Address | Port |
| --- | --- |
| Device 100 | DT port 218 |
| Device 300 | DT port 218 |
| Device 302 | DT port 218 |
| DT switch 200 | DTI port 214 |
| Device 304 | DTI port 214 |
| Device 306 | DTI port 214 |
| Device 308 | port 328 |
| Device 310 | port 330 |

In upstream transmission operation, DT switch 200 receives a packet from device 100 having a source address and a destination address. The destination address is to a device, e.g., 304, 306, 308, and 310, on the upstream side of DT switch 200. DT switch 200 determines to which port the destination address corresponds by reference to the address table maintained by the DT switch and transmits (forwards) the packet via the determined port.

In downstream transmission operation, DT switch 200 receives a packet, having a source address and a destination address, from an upstream device, e.g., 304, 306, 308, and 310. DT switch 200 determines to which port the destination address corresponds based on the address table maintained by the DT switch and transmits (forwards) the packet via the determined port.

Because of the distributed trunk 204 and DT switches 200, 202 maintaining knowledge of port addresses between the DT switches, a downstream transmission route may, in some embodiments, be shorter than the corresponding upstream transmission route. For example, based on the algorithm executed by device 100, an upstream route from device 300 may comprise transmission of a packet to device 100, from device 100 to DT switch 202 via link 208, from DT switch 202 to DT switch 200 via DTI link 210, from DT switch 200 to device 306. A downstream route from device 306, based on the address table information maintained between DT switches 200, 202, comprises transmission of a packet from device 306 to DT switch 200, from DT switch 200 to device 100 via DT link 206, and from device 100 to device 300. In this manner, at least one hop along the transmission route is removed.

Broadcast, multicast, and destination lookup failure transmissions comprise communications to be transmitted from at least one device to at least one other device, i.e., in the case of broadcast transmissions, the transmission is from one device to all connected devices and in the case of multicast transmissions, the transmission is from one device to many connected devices. In the instance of destination lookup failure transmissions, the transmission is from one device to all connected devices. For example, one form of multicast may comprise transmission from a first device to other devices which are part of the same VLAN as the first device.

Broadcast and multicast communication are able to be forwarded by the distributed trunk switches 200, 202 described above, in accordance with a broadcast embodiment according to the present invention. Although referred to as a broadcast embodiment, the particular embodiment is operable in conjunction with a multicast and destination lookup failure embodiment, as well.

Figure 6:
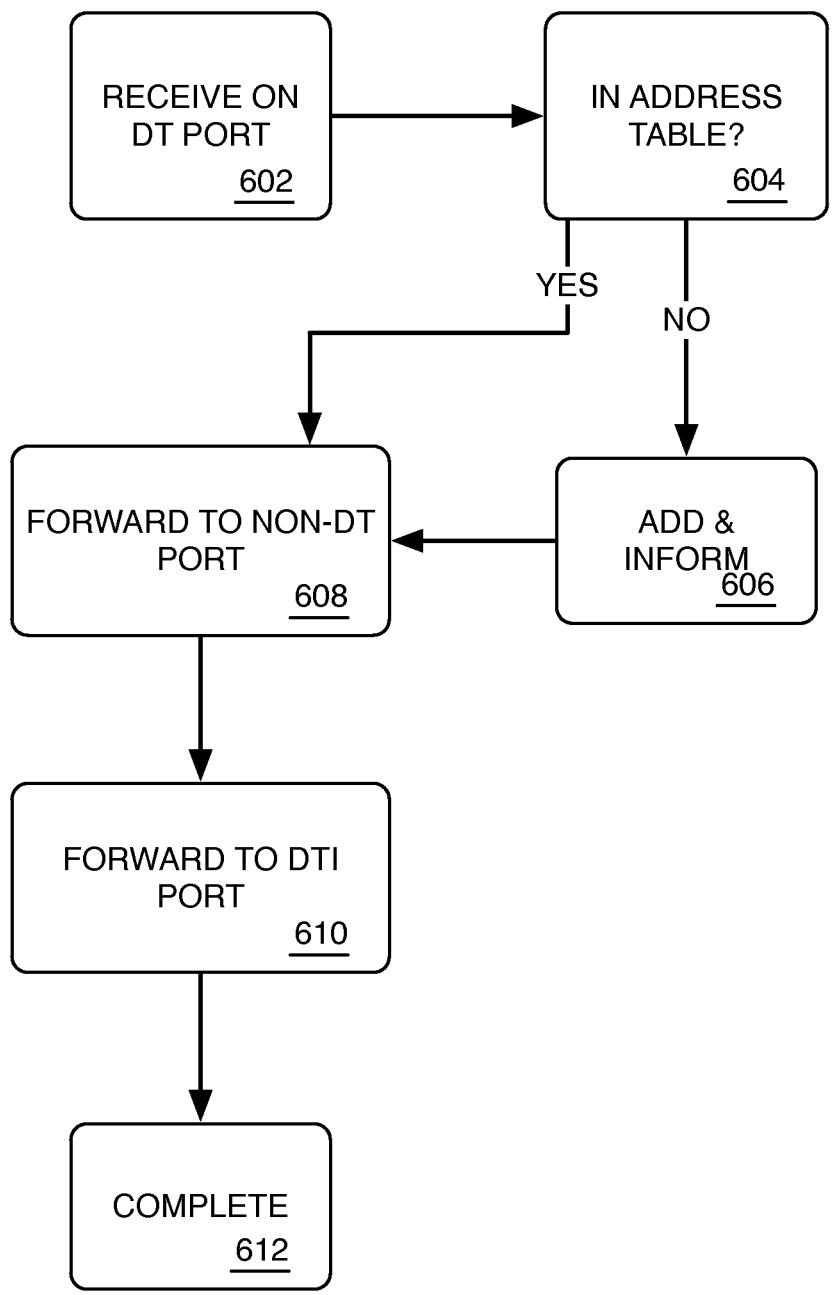
FIG. 6 is a high-level process flow diagram of a portion 600 of a method according to a broadcast embodiment.

The broadcast embodiment is operable with the communication connectivity described in conjunction with FIG. 3, and in particular, operable on DT switches 200, 202. FIG. 6 depicts a high-level process flow diagram of a portion 600 of a method according to the broadcast embodiment wherein one of DT switches 200, 202 executes portion 600 upon receipt of a broadcast communication, e.g., a broadcast packet, via a DT port such as DT port 216.

The process flow begins at receive on DT port functionality 602 wherein one of the DT switches 200, 202 receives a broadcast packet from a device. Given a broadcast packet received from device 100 via DT port 216 at DT switch 200, the flow proceeds to address table check functionality 604 and DT switch determines whether the source address is in the address table of the DT switch. If the source address of the broadcast packet is not in the address table (NO or negative result of functionality 604), the flow proceeds to add and inform functionality 606. If the source address of the broadcast packet is in the address table (YES or positive result of functionality 604), the flow proceeds to forward to non-DT port functionality 608.

During execution of add and inform functionality 606, DT switch 200 adds the source address and port information corresponding to the DT port on which the broadcast packet was received to the address table. DT switch further transmits a signal to DT switch 202 (via DTI link 210) informing the DT switch that the source address is related to the DT 204 and thereby cause DT switch 202 to add the source address to the address table of the DT switch and indicate that the source address corresponds to a DT port, i.e., DT port 218 for DT switch 202.

The flow then proceeds to forward to non-DT port functionality 608 and the DT switch forwards the broadcast packet out the non-DT ports, i.e., non-DT ports 324, 326 to devices 304, 306. In at least some embodiments, forward to non-DT port functionality 608 causes DT switch 200 to forward the broadcast packet out all of the non-DT ports of the DT switch. The flow then proceeds to forward to DTI port functionality 610 and DT switch 200 forwards the broadcast packet out the DTI port 212 to DTI link 210 and toward DT switch 202.

The flow then proceeds to complete functionality 612.

Figure 7:
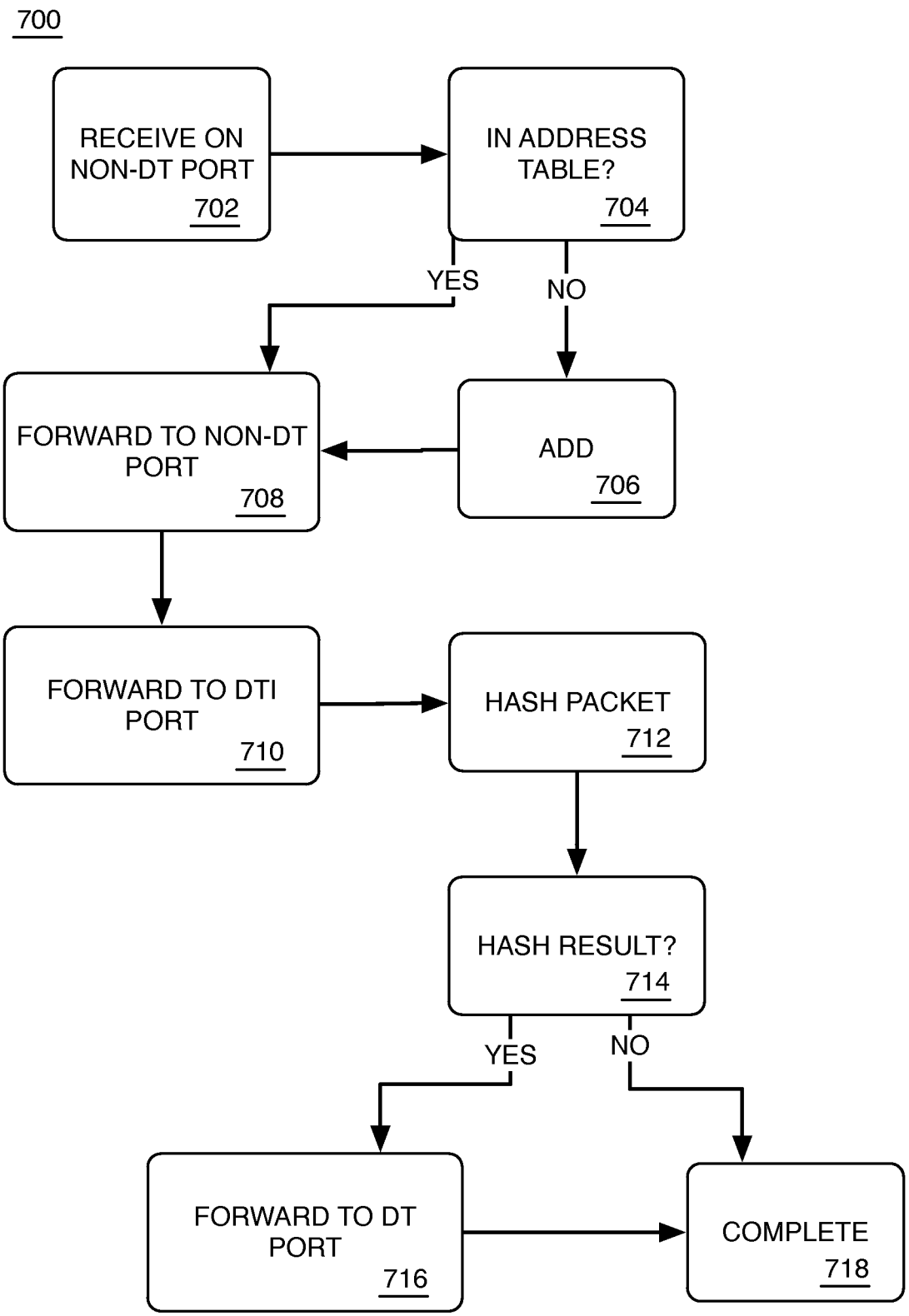
FIG. 7 is a high-level process flow diagram of a portion 700 of another method according to a broadcast embodiment.

FIG. 7 depicts a high-level process flow diagram of a portion 700 of a method according to the broadcast embodiment wherein one of DT switches 200, 202 executes portion 700 upon receipt of a broadcast communication, e.g., a broadcast packet, via a non-DT port such as non-DT port 324.

The process flow begins at receive on non-DT port functionality 702 wherein one of the DT switches 200, 202 receives a broadcast packet from a device. Given a broadcast packet received from device 304 via non-DT port 324 at DT switch 200, the flow proceeds to address table check functionality 704 and DT switch determines whether the source address is in the address table of the DT switch. If the source address of the broadcast packet is not in the address table (NO or negative result of functionality 704), the flow proceeds to add functionality 706. If the source address of the broadcast packet is in the address table (YES or positive result of functionality 704), the flow proceeds to forward to non-DT port functionality 708.

During execution of add functionality 706, DT switch 200 adds the source address and port information corresponding to the non-DT port on which the broadcast packet was received to the address table.

The flow then proceeds to forward to non-DT port functionality 708 and the DT switch forwards the broadcast packet out the non-DT ports, i.e., non-DT port 326 to device 306. In at least some embodiments, forward to non-DT port functionality 708 causes DT switch 200 to forward the broadcast packet out all of the non-DT ports of the DT switch with the exception of the non-DT port on which the packet was received. The flow then proceeds to forward to DTI port functionality 710 and DT switch 200 forwards the broadcast packet out the DTI port 212 to DTI link 210 and toward DT switch 202.

The flow proceeds to hash packet functionality 712. During hash packet functionality 712, DT switch 200 applies an algorithm to information from the broadcast packet to determine whether to forward the broadcast packet out DT port 216. In some embodiments, DT switch 200 applies a hash algorithm to a predetermined portion of the packet, e.g., all or a portion of the source and/or destination address, such as either media access control (MAC) addresses and/or Internet Protocol (IP) addresses, and/or transmission control protocol (TCP) and/or user datagram protocol (UDP) port numbers of the packet. The hash algorithm may perform a modulo two (based on the number of ports in the distributed trunk 204) to determine whether DT switch 200 is to forward the packet out DT port 216. In some embodiments, the hash algorithm applies a different modulo to determine whether to forward the packet out DT port 216.

Both DT switches comprise and apply the same hashing algorithm to determine whether to forward the packet out the respective DT port, i.e., DT port 216, 218. The hashing algorithm is constructed such that one of the DT switches 200, 202 will be determined to be the DT switch which will forward the packet out the DT port to device 100. In at least one embodiment, the hashing algorithm is constructed such that exactly one of the DT switches 200, 202 will be determined to be the DT switch which will forward the packet out the DT port to device 100. In this manner, both DT switches do not forward the packet out both DT ports 216, 218, i.e., a single DT switch forwards the packet out a DT port.

The flow proceeds to hash result functionality 714 and DT switch 200 evaluates the result of hash packet functionality 712. If the result of hash packet functionality 712 is negative (NO), the flow proceeds to complete functionality 718.

If the result of hash packet functionality 712 is positive (YES), the flow proceeds to forward to DT port functionality 716 and DT switch 200 forwards the packet out DT port 216 to device 100. The flow then proceeds to complete functionality 718.

Figure 8:
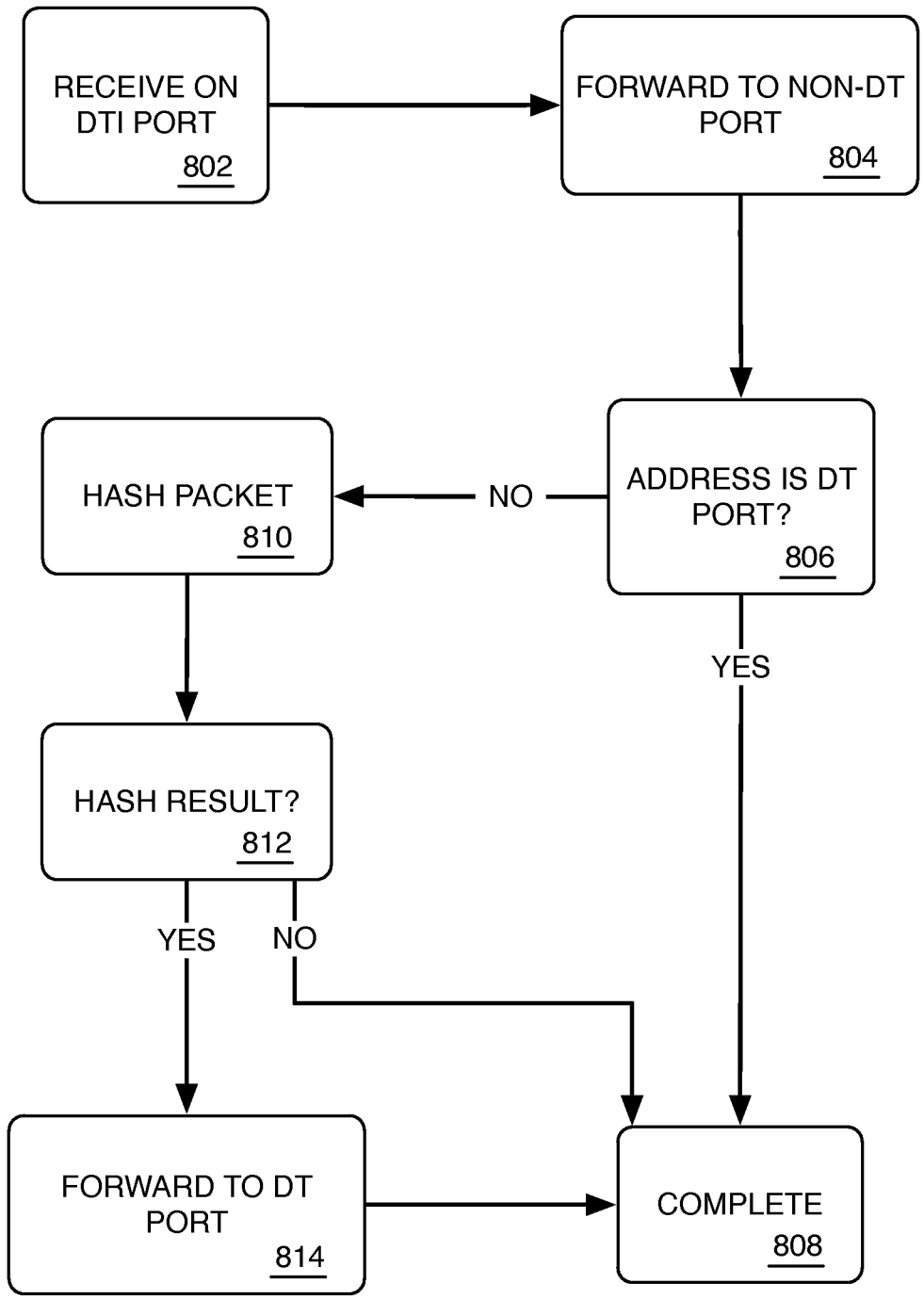
FIG. 8 is a high-level process flow diagram of a portion 800 of another method according to a broadcast embodiment.

FIG. 8 depicts a high-level process flow diagram of a portion 800 of a method according to the broadcast embodiment wherein one of DT switches 200, 202 executes portion 800 upon receipt of a broadcast communication, e.g., a broadcast packet, via a DTI port such as DTI port 212.

The process flow begins at receive on DTI port functionality 802 wherein one of the DT switches 200, 202 receives a broadcast packet from the other DT switch. Given a broadcast packet received from DT switch 202 via DTI port 212 at DT switch 200, the flow proceeds to forward to non-DT port functionality 804. DT switch 200 forwards the broadcast packet out the non-DT ports, i.e., non-DT ports 324, 326 to devices 304, 306. In at least some embodiments, forward to non-DT port functionality 804 causes DT switch 200 to forward the broadcast packet out all of the non-DT ports of the DT switch.

The flow then proceeds to DT port address check functionality 806 wherein DT switch 200 determines whether the source address is associated with a DT port in the address table of the DT switch. If the result of DT port address check functionality 806 is positive (YES), then the flow proceeds to complete functionality 808. If the result of DT port address check functionality 806 is negative (NO), then the flow proceeds to hash packet functionality 810. Packets having a source address associated in the DT switch address table with a DT port are traveling upstream, whereas packets having a source address which is not associated in the address table with a DT port are traveling downstream and proceed to hash packet functionality 810.

During hash packet functionality 810, DT switch 200 applies an algorithm to information from the broadcast packet to determine whether to forward the broadcast packet out DT port 216. In some embodiments, DT switch 200 applies a hash algorithm to a predetermined portion of the packet, e.g., all or a portion of the source and/or destination address, such as either media access control (MAC) addresses and/or Internet Protocol (IP) addresses, and/or transmission control protocol (TCP) and/or user datagram protocol (UDP) port numbers of the packet. The hash algorithm may perform a modulo two (based on the number of ports in the distributed trunk 204) to determine whether DT switch 200 is to forward the packet out DT port 216. In some embodiments, the hash algorithm applies a different modulo to determine whether to forward the packet out DT port 216.

Both DT switches comprise and apply the same hashing algorithm to determine whether to forward the packet out the respective DT port, i.e., DT port 216, 218. The hashing algorithm is constructed such that one of the DT switches 200, 202 will be determined to be the DT switch which will forward the packet out the DT port to device 100. In at least one embodiment, the hashing algorithm is constructed such that exactly one of the DT switches 200, 202 will be determined to be the DT switch which will forward the packet out the DT port to device 100. In this manner, both DT switches do not forward the packet out both DT ports 216, 218, i.e., a single DT switch forwards the packet out a DT port.

The flow proceeds to hash result functionality 812 and DT switch 200 evaluates the result of hash packet functionality 810. If the result of hash packet functionality 810 is negative (NO), the flow proceeds to complete functionality 808.

If the result of hash packet functionality 810 is positive (YES), the flow proceeds to forward to DT port functionality 814 and DT switch 200 forwards the packet out DT port 216 to device 100. The flow then proceeds to complete functionality 808.

Figure 9:
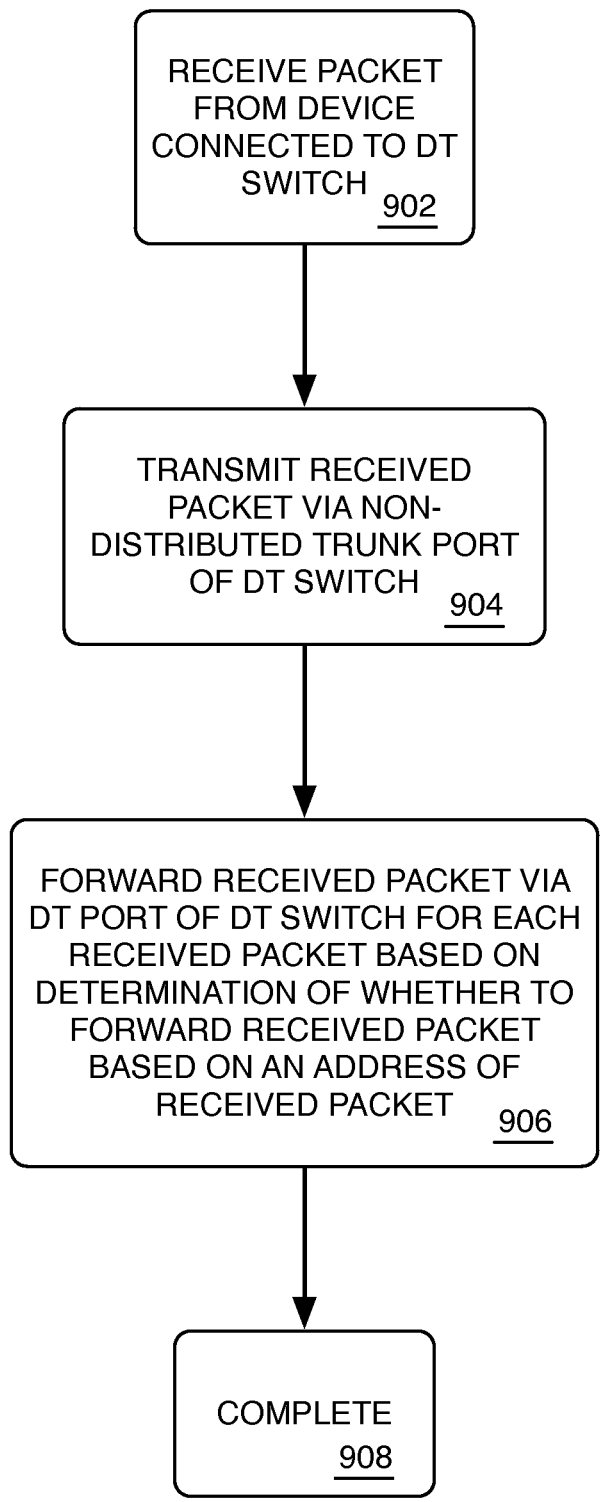
FIG. 9 is a high-level process flow diagram of a portion 900 of another method according to a broadcast embodiment.

FIG. 9 depicts a high-level process flow diagram of a portion 900 of a method according to another embodiment wherein one of DT switches 200, 202 executes portion 900 upon receipt of a broadcast communication.

The process flow begins at receive packet functionality 902 wherein one of the DT switches 200, 202 receives a broadcast packet from a device connected to the DT switch. The flow proceeds to transmit functionality 904 wherein one of the DT switches 200, 202 transmits the received packet via a non-distributed trunk port of the DT switch.

The flow proceeds to forward received packet functionality 906 wherein one of the DT switches 200, 202 forwards the received packet via a DT port of the DT switch for each received packet based on a determination of whether to forward the received packet based on an address of the received packet. The flow then proceeds to complete functionality 908.

Figure 10:
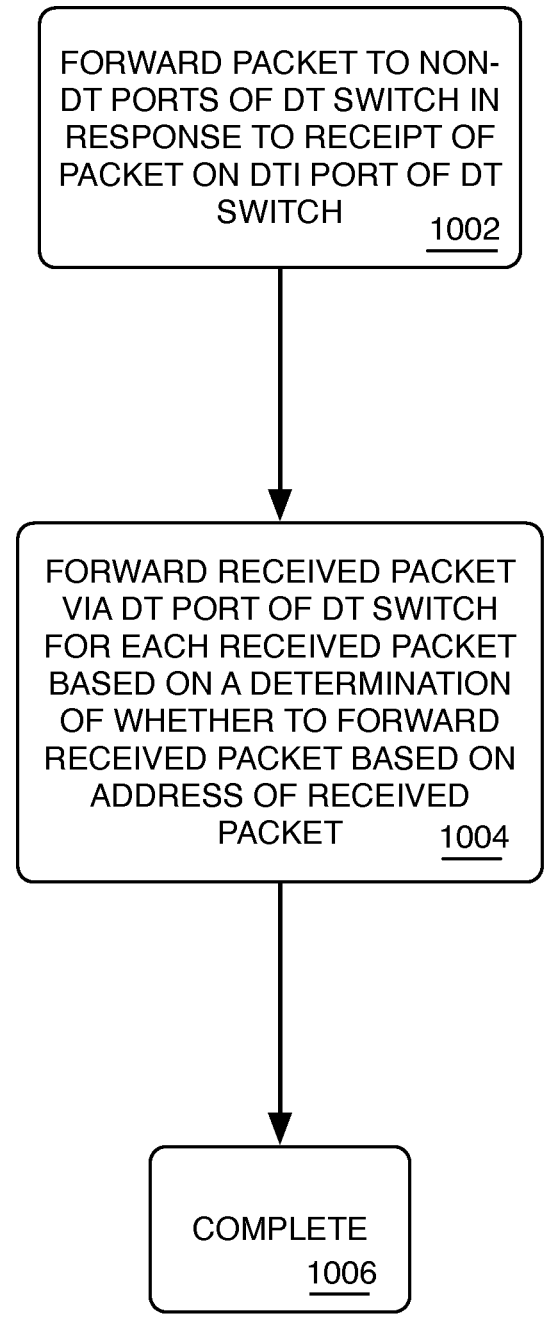
FIG. 10 is a high-level process flow diagram of a portion 1000 of another method according to a broadcast embodiment.

FIG. 10 depicts a high-level process flow diagram of a portion 1000 of a method according to another embodiment wherein one of DT switches 200, 202 executes portion 1000 upon receipt of a broadcast communication.

The process flow beings at forward packet functionality 1002 wherein one of the DT switches 200, 202 forwards a received packet to non-DT ports of the DT switch in response to receipt of the packet on a DTI port of the DT switch. The flow proceeds to forward received packet functionality 1004 wherein one of the DT switches 200, 202 forwards the received packet via a DT port of the DT switch for each received packet based on a determination of whether to forward the received packet based on the address of the received packet. The flow then proceeds to complete functionality 1006.

The functions of a method described in connection with the embodiments disclosed herein may be embodied in hardware, software, or a combination thereof. Software comprising instructions for execution may reside in a computer-readable medium comprising volatile and/or non-volatile memory, e.g., a random access memory, a read only memory, a programmable memory, a hard disk, a compact disc, or another form of storage medium readable, directly or indirectly, by a processing device.

What is claimed is:

1. A method of transmitting a packet from a distributed trunk (DT) switch, comprising:
   receiving a packet from a device connected to the DT switch;
   transmitting the received packet to a second device via a non-distributed trunk (non-DT) port of the DT switch;
   forwarding the received packet via a distributed trunk interconnect port to a second DT switch;
   determining, based at least on the received packet, whether the received packet is to be forwarded to a third device by the DT switch, wherein the third device is connected to both the DT switch and the second DT switch; and
   based on a determination that the received packet is to be forwarded to the third device by the DT switch, forwarding the received packet to the third device by the DT switch.

2. The method as claimed in claim 1, wherein the receiving a packet comprises receiving one of a broadcast packet, a multicast packet, and a destination lookup failure packet.

3. The method as claimed in claim 1, wherein determining, based on the received packet, whether the received packet is to be forwarded to the third device by the DT switch comprises:
performing a hash on an address of the received packet.

4. The method as claimed in claim 3, wherein the performing a hash further comprises:
performing a hash on one of a source address, a destination address, a media access control (MAC) address, an internet protocol (IP) address, a transmission control protocol (TCP) port number, and a user datagram protocol (UDP) port number.

5. The method as claimed in claim 3, wherein the performing a hash further comprises:
performing a hash in relation to the number of ports of the DT switch.

6. The method as claimed in claim 1, further comprising:
adding a source address of the received packet to an address table of the DT switch; and
forwarding the source address of the received packet to the second DT switch via the distributed trunk interconnect port.

7. The method as claimed in claim 1, further comprising:
determining whether a source address of the received packet corresponds to a DT port of the DT switch.

8. The method of claim 1, wherein the determination is based on a number of portions of an address in the received packet.

9. The method of claim 1, wherein the determination is further based on a number of additional received packets.

10. The method of claim 1, wherein forwarding the received packet via a distributed trunk interconnect port to the second DT switch causes the second DT switch to:
determine, based at least on the received packet, whether the received packet is to be forwarded to the third device by the second DT switch;
based on a determination that the received packet is to be forwarded to the third device by the second DT switch, to forward the received packet; and
based on a determination that the received packet is not to be forwarded to the third device by the second DT switch, not to forward the received packet.

11. The method of claim 10, wherein determining whether the received packet is to be forwarded to the third device by the DT switch comprises performing a function, and wherein determining whether the received packet is to be forwarded to the third device by the second DT switch comprises performing the function.

12. A non-transitory computer-readable medium storing instructions which, when executed by a processor of a distributed trunk (DT) switch, cause the processor to:
receiving a packet from a device connected to the DT switch;
transmitting the received packet to a second device via a non-distributed trunk (non-DT) port of the DT switch;
forwarding the received packet via a distributed trunk interconnect port to a second DT switch;
make a determination, based at least on a portion of an address within the received packet, whether the received packet is to be forwarded to a third device by the DT switch, wherein the third device is connected to both the DT switch and the second DT switch, and
based on the determination, selectively forward the received packet to the third device by the DT switch.

13. The computer-readable medium as claimed in claim 12, wherein making the determination comprises performing a hash on the portion of the address in the received packet.

14. The computer-readable medium as claimed in claim 13, wherein performing the hash comprises performing the hash on a portion of one of a source address, a destination address, a media access control (MAC) address, an internet protocol (IP) address, a transmission control protocol (TCP) port number, and a user datagram protocol (UDP) port number.

15. The computer-readable medium as claimed in claim 13, wherein performing the hash comprises performing the hash in relation to the number of ports of the DT switch.

16. The computer-readable medium as claimed in claim 12, wherein the received packet comprises one of a broadcast packet, a multicast packet, and a destination lookup failure packet.

17. The non-transitory computer-readable medium of claim 12, wherein selectively forwarding the received packet to the third device by the DT switch causes the third device to:
determine, based at least on the received packet, whether the received packet is to be forwarded to the third device by the DT switch;
based on a determination that the received packet is not to be forwarded to the third device by the DT switch, to forward the received packet; and
based on a determination that the received packet is to be forwarded to the third device by the DT switch, not to forward the received packet.

18. The non-transitory computer-readable medium of claim 17, wherein determining whether the received packet is to be forwarded to the third device by the DT switch comprises performing a function, and wherein determining whether the received packet is to be forwarded to the third device by the second DT switch comprises performing the function.

* * * * *